UNITED STATES PATENT OFFICE.

HENRY DEACON, OF APPLETON HOUSE, WIDNES, ENGLAND.

IMPROVEMENT IN MANUFACTURE OF CHLORINE.

Specification forming part of Letters Patent No. 165,802, dated July 20, 1875; application filed June 26, 1875.

CASE A.

*To all whom it may concern:*

Be it known that I, HENRY DEACON, of Appleton House, Widnes, in the county of Lancaster, England, alkali manufacturer, have invented Improvements in the Manufacture of Chlorine, of which the following is a specification:

In the manufacture of chlorine, by what is known as Deacon's process, a heated mixture of hydrochloric-acid gas and air is passed over pieces of inert porous substances, such as burnt clay, which substances are impregnated with one or more active chemical substances, one of which may be sulphate of copper, which active chemical substances are described in the specification of former patents granted to me—as, for instance, in Letters Patent No. 85,370, of December 29, 1868; Nos. 118,209–12, of August 22, 1871, and No. 141,333, of July 29, 1873.

Now, one part of this invention consists in using, instead of burnt clay, such porous substances as consist, mainly, of sesquioxide of iron—as, for example, the residue or cinder left after burning iron pyrites. I impregnate such substances with solutions of sulphate of copper, or with other active chemical substance or substances, in the same way that the pieces of burnt clay are impregnated, as described in specifications of patents granted to me hereinafter referred to. Or, if the residue or cinder result from the burning of cupreous pyrites or other mineral containing much copper or other active chemical substance, the copper naturally present may be sufficiently active without further addition, but usually the cupreous pyrites employed in chemical works yield a residue or cinder in which the copper is in an inactive condition until dissolved in water, and when using this kind of residue or cinder I add water or dilute acid if necessary to it, in order to render the copper soluble, and also to render it active, and I also add if necessary a solution of sulphate of copper or other active chemical substance to it if it does not contain sufficient active chemical substance after calcination.

I employ the porous substance consisting mainly of sesquioxide of iron impregnated, as described, with an active chemical substance, which may be sulphate of copper, in such apparatus as are described in the specifications of my former patents, or in any other convenient apparatus.

The second part of this invention consists in the addition to the salts of copper or to the other chemical active agents mentioned in the specifications of my former patents, of magnesia or of one of its salts, or instead of employing such before-referred-to porous substances I use a porous substance containing magnesia or a salt thereof in material quantity as one of its natural constituents. For example, in conjunction with salts of copper, sulphate of magnesia may be employed instead of or in addition to the sulphate of soda or of potash mentioned in my Letters Patent No. 141,333; but the effect produced by magnesia and its salts, and by bodies of the same chemical nature or clay, is essentially different from the effect produced by soda and its salts and bodies of the same chemical nature, in so far that bodies of the magnesia class promote or accelerate the formation of chloride of copper, and bodies of the soda class hinder or retard its formation. Barium is a body of the magnesia class, but I prefer magnesia or a mineral containing magnesia, and in a divided condition—for example, magnesite may be employed instead of the porous pieces of burnt clay referred to in the specification of a patent granted to me on the 29th day of December, 1868. The porous materials impregnated with the copper and magnesian salts or the natural magnesian product or mineral—such, for example, as magnesite after impregnation with a salt of copper or with other active chemical agents—may be employed in the manner set forth in the specifications before referred to, or in any modification of such apparatus or process.

Instead of employing salts or compounds of magnesia alone in conjunction with salts of copper, a salt or compound of barium or other element of like chemical nature may be employed with the salts of copper, either alone or in conjunction with magnesia, or, with the salts of magnesium, may be employed for impregnating the porous substances herein referred to.

I claim—

1. The employment in the described process for the production of chlorine of such porous substances as consist mainly or essentially of sesquioxide of iron, in the manner and for the purpose hereinbefore mentioned.

2. The employment in the described process for the production of chlorine of porous substances impregnated with salts or compounds of magnesia in conjunction with salts or compounds of copper, or with other described active chemical agents, in the manner and for the purpose hereinbefore described.

3. The employment in the described process for the production of chlorine of natural magnesian minerals or products, the same being impregnated with salts of copper or with other described active chemical agents, and employed in the manner and for the purposes herein referred to.

In witness whereof I have signed my name to this specification in the presence of two subscribing witnesses.

HENRY DEACON.

Witnesses:
 S. CROWE,
 F. G. LARGE,
  2 *Waterloo Place, Pall Mall, London.*